United States Patent [19]
Greenwood et al.

[11] Patent Number: 5,173,177
[45] Date of Patent: Dec. 22, 1992

[54] ANTI-PLUGGING ADJUSTABLE ORIFICE FOR GAS SPARGED HYDROCYCLONE

[75] Inventors: Brian F. Greenwood; John W. Chamblee; Thomas R. Delcourt, all of Glens Falls, N.Y.

[73] Assignee: Kamyr, Inc., Glens Falls, N.Y.

[21] Appl. No.: 675,807

[22] Filed: Mar. 27, 1991

[51] Int. Cl.$^5$ .................. B04C 5/16; B04C 5/181; B04C 5/10; B03D 1/14
[52] U.S. Cl. .................... 209/170; 209/211; 210/512.1; 210/512.3; 210/221.2; 162/4; 162/5; 261/122.1
[58] Field of Search ............. 209/170, 211; 261/122; 210/512.1, 221.2, 512.3; 162/5, 4

[56] References Cited

U.S. PATENT DOCUMENTS

| | | | |
|---|---|---|---|
| 2,106,532 | 1/1938 | Lockett | 209/211 |
| 3,213,879 | 10/1965 | Thompson | 209/211 |
| 3,243,043 | 3/1966 | Thompson | 209/144 |
| 3,249,227 | 5/1966 | Long | 209/211 |
| 3,802,570 | 4/1974 | Dehne | 209/211 |
| 4,134,828 | 1/1979 | Trawinski | 209/211 |
| 4,587,024 | 5/1986 | Hayatdavoudi | 209/211 |
| 4,744,890 | 5/1988 | Miller | 209/211 |
| 4,872,973 | 10/1989 | Ikebuchi | 209/211 |
| 4,971,685 | 11/1990 | Stanley | 209/211 |

FOREIGN PATENT DOCUMENTS

| | | | |
|---|---|---|---|
| 2355229 | 5/1974 | Fed. Rep. of Germany | 209/211 |
| 1314443 | 4/1957 | France | 209/211 |
| 544474 | 3/1977 | U.S.S.R. | 209/211 |
| 566633 | 7/1977 | U.S.S.R. | 209/211 |
| 1121048 | 10/1984 | U.S.S.R. | 209/211 |
| 1180080 | 9/1985 | U.S.S.R. | 209/211 |
| 1005479 | 9/1965 | United Kingdom . | |

Primary Examiner—Stanley S. Silverman
Assistant Examiner—Thomas M. Lithgow
Attorney, Agent, or Firm—Nixon & Vanderhye

[57] ABSTRACT

In a hydrocyclone, particularly for deinking of paper pulp, a movable generally cylindrical plug is utilized to define an annular space near the accepts withdrawal conduit to effect release of obstructions should the annular space become clogged. The plug is biased by a spring, and moved against the spring pressure to enlarge the annular space automatically in response to a build up of back pressure. The plug also may be moved manually from exteriorly of the hydrocyclone housing, or may be operated by fluidic elements on a periodic basis to clean the annular space whether or not there has been a build up of back pressure. The hydrocyclone preferably is a gas sparged hydrocyclone, and recycled paper—with print on it—having a consistency of at least about 2% is treated to effect deinking.

6 Claims, 3 Drawing Sheets

ANTI-PLUGGING ADJUSTABLE ORIFICE FOR GAS SPARGED HYDROCYCLONE

BACKGROUND AND SUMMARY OF THE INVENTION

In the utilization of gas sparged hydrocyclones of the type such as shown in U.S. Pat. No. 4,838,434, particularly in the deinking or other treatment of comminuted cellulosis fibrous material having print thereon by a method as disclosed in co-pending application Ser. No. 07/564,656 (now U.S. Pat. No. 5,069,751) filed Aug. 9, 1990 (the disclosure of which is hereby incorporated by reference herein), the flow rate through the hydrocyclone is controlled with an orifice, which can be adjusted by changing a pedestal component of the hydrocyclone. The orifice establishes swirl layer thickness, and therefore the flow rate of the accepts through the accepts conduit. The annular opening in which the swirl layer is formed is dependent upon the location of the tapered pedestal which is centered in a cylindrical body, and the flow across the annular opening is a function of the pressure drop across the orifice and of the radial clearance between the pedestal and the cylindrical surface.

Utilizing the gas sparged hydrocyclone as set forth above in the deinking of news print and the like, particles—such as pieces of cardboard, unrefined paper, or the like—which are oversized with respect to the annular opening become lodged between the pedestal and the cylindrical surface. As the particles build up the annular opening decreases inside and back pressure in the unit increases. The increase in back pressure decreases the efficiency of the hydrocyclone by intensifying the reject rate above desired operating conditions. The situation continues until the annular opening is finally fully obstructed. In order to unplug the unit, either before or after complete operation has ceased, it is necessary to stop the deinking process, and take the unit apart.

It has been suggested in U.S. Pat. No. 4,838,434 that if the annular gap becomes clogged that the tapered pedestal can be moved downwardly through an opening in the bottom of the hydrocyclone to thereby increase the effective gap, and allow the particles to pass through. However the implication of such a concept would require complicated sealing elements, does not allow for a larger pressure differential on the material, and may have other practical difficulties associated therewith.

According to the present invention, a hydrocyclone, and a method of deinking paper, are provided which allow practical implementation of the general concept in said U.S. Pat. No. 4,838,434 of allowing obstructing particles to pass through the annular space defined adjacent the accepts outlet of the hydrocyclone (particularly a gas sparged hydrocyclone). According to the present invention, practical implementation of this concept is provided by enlarging the diameter of the body defining the hydrocyclone below where the annular space is defined, and defining the annular space with a movable plug element that is contained—except possibly for a manual or pneumatic actuating element therefor—completely within the hydrocyclone. Preferably the plug is pressed by a spring into a position defining an annular gap with a first diameter internal opening in the body, and movable against the bias of the spring into operative association with a second diameter portion of the body, which is substantially larger than the first diameter. Such a construction not only allows the entire plug to be mounted within the hydrocyclone housing, but because of the enlarged opening past the annular gap, provides a higher pressure differential, desirable in maintaining a predetermined flow rate during normal operation, and facilitating flushing of obstructions should they collect in the annular gap.

According to one aspect of the present invention, a hydrocyclone is provided comprising: A substantially hollow body having first and second ends, and having a wall disposed about an axis and axially elongated. Inlet means for introducing a suspension into the hollow body at the first end thereof, so that the suspension flows in a vortex within the hollow body. First withdrawing means for withdrawing fluid from adjacent the axis at the first end of the body. Second withdrawing means for withdrawing suspension from adjacent the second end of the body. The hollow body having a first, relatively small, internal open diameter near the second end, and a second, relatively large, internal open diameter between the first diameter and the second withdrawing means. And, movable plug means mounted within the body near the second withdrawing means for defining an annular space controlling the flow rate through the second withdrawing means, and movable to release any substance that becomes trapped in the annular space restricting the flow through the second withdrawing means. The plug means comprising a generally cylindrical plug element biased by a spring into a position normally defining the annular space between the plug element and the body at the first diameter, and movable against the spring bias (entirely within the hydrocyclone housing) to a position wherein the plug is in association with the second diameter, at which position any substance trapped in the annular space is released to flow to the second withdrawing means. The cyclone may comprise a gas sparged hydrocyclone having a porous surface of revolution disposed within the hollow body wall generally symmetrical with the axis, and a plenum defined between the body wall and the porous surface of revolution. Means are provided for introducing fluid—typically air—into the plenum to pass through the porous surface of revolution into the vortex.

The movable plug means typically comprises means for automatically moving as a result of back pressure caused by a substance that becomes trapped in the annular space, to automatically release the substance. Fluid powered means may be provided for selectively moving the plug element against the bias of the spring by fluid pressure internal of the plug element. The fluid power means may comprise: A first internal cylindrical chamber, and a piston disposed within the first chamber and having a length less than the length of the chamber. Means for holding the piston stationary with respect to the body. And bushing means for guiding relative movement between the first chamber and the piston, so that upon application of fluid under pressure into the chamber, the plug element will move in the chamber against the bias of the spring while the piston remains stationary. Alternatively, a manual means may be provided—such as a link extending exterior of the body but connected to the plug, and surrounded by the spring—which effects movement of the plug element.

According to another aspect of the present invention, a method of acting upon a low consistency liquid-solid suspension to separate undesirable materials therefrom, utilizing a hydrocyclone having an annular space through which accepted suspension passes is provided. The method comprises the steps of: (a) Introducing the suspension into a vortex, the vortex extending in a spiral path in a first direction. (b) Sparging air into the suspension in the vortex to cause undesirable particles to attach to air bubbles and flow in a second direction, generally opposite the first direction. (c) Removing particles with air from the flow in the second direction. (d) Removing accepted suspension through the annular space adjacent an end termination of the vortex in the first direction. And, (e) should plugging of the annular space occur as a result of a substance being caught therein, which causes reduced flow of the accepted suspension, unplugging the annular space without interruption of the practice of steps (a)–(d), by increasing the size of the annular space while simultaneously exposing the substance to an enlarged volume adjacent the end termination of the vortex in the first direction, providing a high pressure differential, so that unplugging of the annular space without interruption of the practice of steps (a)–(d) occurs. The method is particularly applicable to the deinking of news print or the like, in which case step (a) is practiced by introducing the suspension of finely comminuted paper having print thereon and a consistency of about 2% or more, and step (c) is practiced by removing ink particles attached to the comminuted paper. Regardless of whether or not plugging occurs, according to the invention it is also contemplated to periodically automatically move the movable plug element defining the annular space, as by applying fluid pressure to an internal component of the plug to effect movement of the plug against spring pressure.

It is the primary object of the present invention to provide an effective hydrocyclone, such as a gas sparged hydrocyclone useful in the treatment of paper suspensions (e.g. deinking of recycled paper) to practically prevent disruption or stoppage of the hydrocyclone functionality as a result of the plugging, and without interruption of the hydrocyclone functionality. This and other objects of the invention will become clear from an inspection of the detailed description of the invention, and from the appended claims.

DETAILED DESCRIPTION OF THE DRAWINGS

Figure 1:
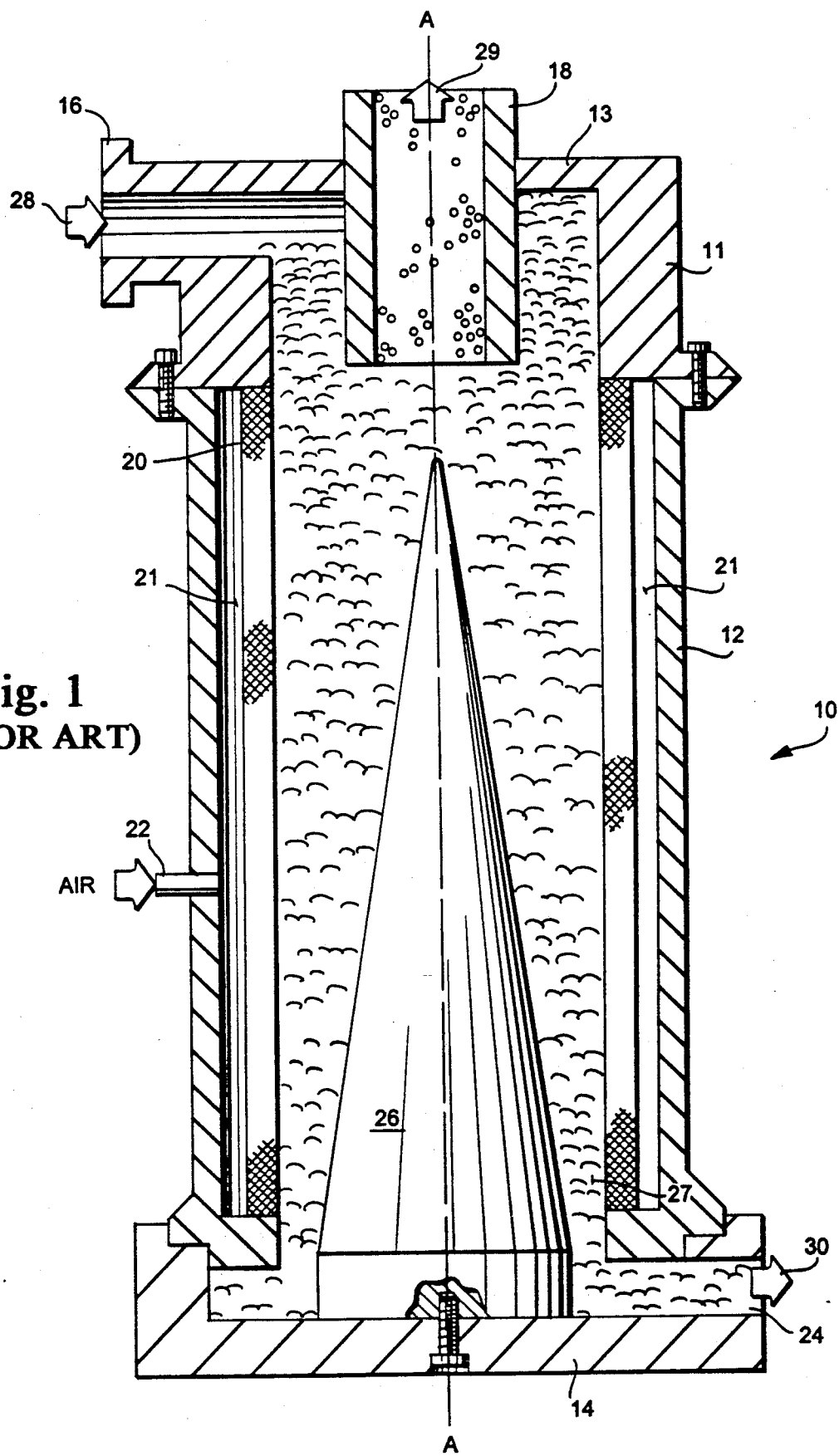
FIG. 1 is a side view, partly in cross-section and partly in elevation, which schematically illustrates an exemplary prior art gas sparged hydrocyclone.

An exemplary gas sparged hydrocyclone according to the prior art is illustrated generally by reference numeral 10 in FIG. 1. Such a hydrocyclone is described and illustrated in more detail in U.S. Pat. No. 4,838,434, the disclosure of which is hereby incorporated by reference herein. It includes a substantially hollow body, indicated by elements 11 and 12 in FIG. 1, having first and second ends 13, 14 respectively, and a wall (formed by wall portions 11, 12) disposed about an axis A and axially elongated. Normally, although not necessarily, the first end 13 is the top and the second end 14 the bottom.

The hydrocyclone 10 also includes inlet means 16 for introducing a suspension into the hollow body 11, 12 at the first end 13 thereof so that the suspension flows in a vortex within the hollow body. First withdrawing means 18 are provided for withdrawing fluid adjacent the axis A—A at the first end 13 of the body 11, 12. A porous surface of revolution 20 is disposed within the hollow body wall 12, generally symmetrical with the axis A—A, a plenum 21 defined between the body wall 12 and the porous surface of the revolution 20. Means—such as the air conduit 22—are provided for introducing fluid (typically air or other gas) into the plenum 21 to pass through the porous surface of revolution 20 into the suspension vortex.

A second withdrawing means, conduit 24, is provided for withdrawing suspension from adjacent the second end 14 of the body. Disposed within the interior of the hydrocyclone 10, extending upwardly from the second end 14, is a pedestal 26, which typically is a tapered plug as illustrated in FIG. 1, and defines an annular space (gap) 27 which determines the flow rate through the second withdrawing means 24. In practice, when it is desired to change the flow rate, operation of the hydrocyclone 10 is terminated, and the pedestal is replaced with another pedestal having a different diameter thereby defining a different size annular space 27.

As shown in U.S. patent application Ser. No. 07/564,656 Aug. 9, 1990 (the disclosure of which is hereby incorporated by reference herein), typically the suspension introduced at 28 is finely comminuted paper having print thereon (e.g. news print), and although operational at a consistency of about 0.5–4%, typically the consistency is about 2% or more. In such a situation, the discharge 29 through the first withdrawing means 18 comprises ink particles attached to the comminuted paper, which have been separated by flotation due to the gas sparging action, and the discharge 30 through second withdrawing means 24 is the accepts paper pulp ultimately utilized to make recycled paper.

A significant problem with the prior art configuration of FIG. 1 is that foreign material—such as large chunks of cardboard, unrefined pieces of news print, or the like—can plug up the annular space 27, increasing the back pressure within the hydrocyclone 10, and decreasing its efficiency until it ultimately plugs up completely and the operation must be terminated and the materials causing the plugging removed. While there have heretofore been proposals for overcoming this plugging action, such as discussed in U.S. Pat. No. 4,838,434, they have not appeared to be particularly practical, and in any event have not as yet been commercially adopted. According to the present invention, a method and apparatus are provided for automatically (or optionally manually or periodically) effecting deplugging without interrupting the operation of the hydrocyclone 10.

Figure 2:
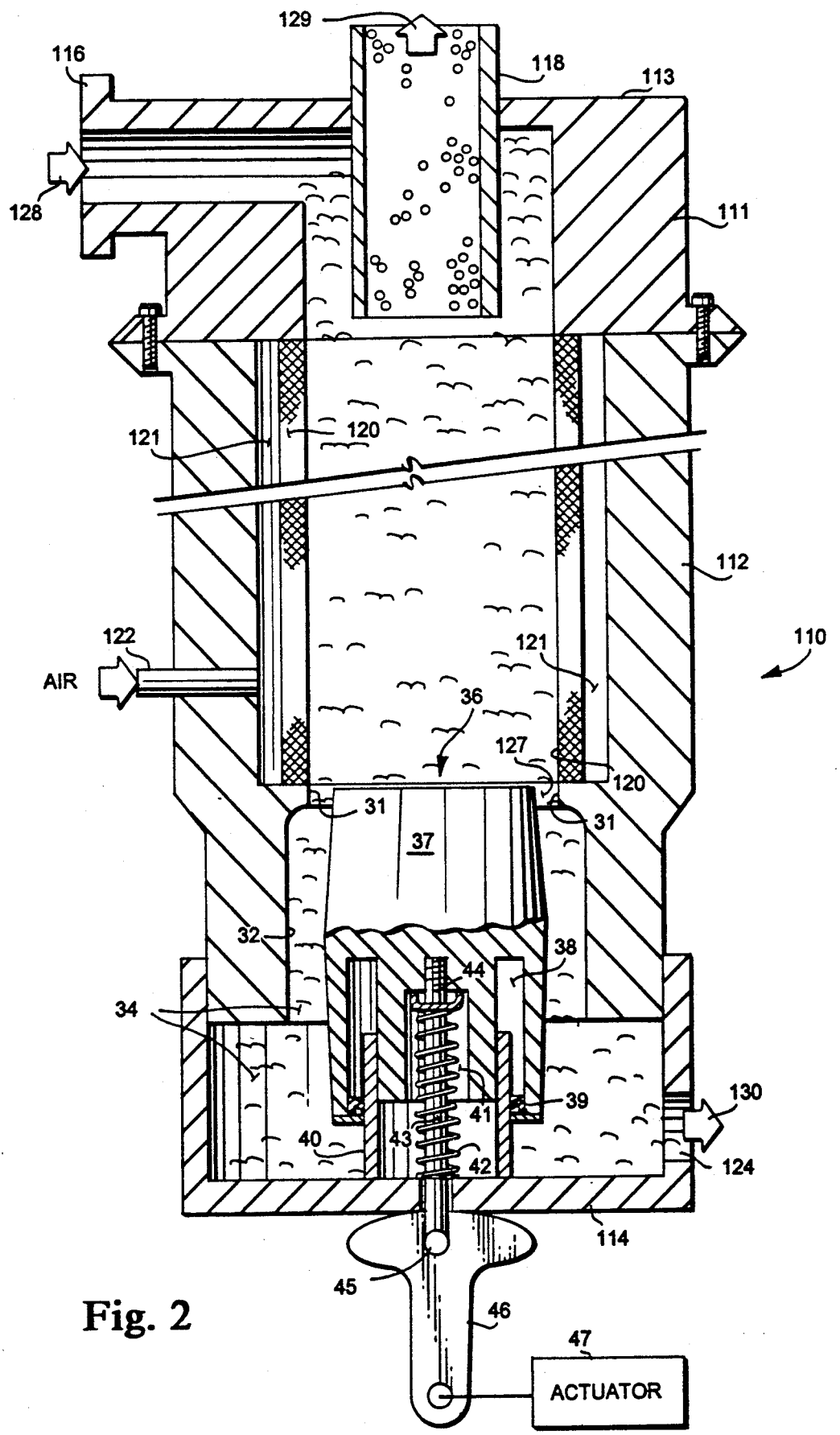
FIG. 2 is a view like that of FIG. 1 of an exemplary first embodiment of a gas sparged hydrocyclone according to the present invention.

In FIG. 2, one embodiment of an exemplary hydrocyclone according to the invention is illustrated generally by reference 110. In this figure, structures comparable to the prior art structure of FIG. 1 are illustrated by the same two digit reference numeral, only preceded by a "1". It will thus be seen that the hydrocyclone 110 has a hollow body defined by walls 110, 112, first end 113, second end 114, vortex inlet 116, first withdrawal means 118, porous surface of revolution 120 defining a plenum 121 with the wall 112, a sparging fluid inlet 122 to the plenum 121, and a second withdrawal means 124 adjacent the second end 114, for withdrawing accepts (e.g. accepted paper pulp during paper recycling).

As illustrated in FIG. 2, an annular space 127 is defined near the second end 114 of the hydrocyclone 110 by the wall surface 31 and a movable plug means illustrated generally by reference numeral 36. The portion 31 of the hydrocyclone body 112 has a first, relatively small diameter, which either gradually or abruptly increases to a second, significantly larger, internal open diameter 32. Thus, just below the porous surface of revolution 120 there is a significantly larger volume 34, having a much larger effective volume than in the prior art illustrated in FIG. 1 not only because of the second diameter section 32 defining the internal body opening, but because the plug means 36 does not fill a large part of the volume, as is the case for the tapered pedestal 26 in the FIG. 1 prior art structure, the plug being generally cylindrical, and truncated. This enlarged volume 34 means that the pressure differential is increased compared to the prior art structure of FIG. 1, which has beneficial effects not only when it is desired to unplug the annular space 127, but also during normal operation of the hydrocyclone 110.

The plug means 36 comprises—in the preferred embodiment illustrated in FIG. 2—a generally cylindrical (i.e. generally constant diameter) plug element 37 having a first generally cylindrical internal annular opening 38, open at the bottom thereof, and a second generally tubular opening 39, also open at the bottom thereof. A guide tube 40 extends upwardly from the second end 114 of the hydrocyclone 110 and is disposed in the annular opening 38 to guide reciprocal movement of the plug element 37, and also to provide a bottom stop for that movement if necessary. A fluid seal 41 may be provided at the bottom of the plug element 37 to cooperate with the guide tube 40 to minimize the amount of suspension entering the annular opening 38. The interior surface of the guide tube 40 engages that part of the plug 37 between the openings 38, 39 to provide the guiding action. The whole range of travel of the plug element 37 is within the hydrocyclone housing.

Disposed within the guide tube 40 and tubular opening 39 is a coil spring 42, disposed about a rod 43 which is screwed in at the top 44 thereof to the plug element 37 so that it moves with the plug element 37, and is attached at the bottom 45 thereof to an actuator lever 46 external of the hydrocyclone 110, which may be actuated manually by the powered actuator 47. Only the rod 43 extends between the interior and exterior of the hydrocyclone, not the whole plug 37.

In operation of the hydrocyclone 110, should the annular gap 127 become plugged, the back pressure in the hydrocyclone 110 will increase. Ultimately it will increase to the extent that it exerts a greater force on the plug element 37 than does the spring 42, thereby effecting compression of the spring 42 and downward movement of the plug element 37. The downward movement of the plug element 37 causes the annular gap 127 to increase in size, ultimately exposing the trapped material or substance to the enlarged volume 34, so that the previously trapped substance may flow past what was previously the annular gap 127, and out the second withdrawal means 124. Once the obstruction—and associated back pressure—are removed, the spring 42 automatically biases the plug 37 back to its original position defining the annular opening 127.

The area of the annular opening 127 as well as the back pressure required to initiate the downward movement of the plug 37 may be adjusted by adjusting the preloaded compression of the spring 42. Also, if it is desired to ensure that no plugging of the annular opening 127 is starting to occur, the plug 37 may be manually moved downwardly (as viewed in FIG. 2) by acting upon the rod 43 either by manually (by hand or with a manual tool) pivoting the lever 46 from exterior of the hydrocyclone 110, or by effecting operation of the powered actuator 47 to effect movement of the lever 46.

While the hydrocyclone 110 may be utilized in the practice of a wide variety of processes, one particularly practical utilization thereof is in the deinking or like treatment of ground news print in the production of recycled paper. Typically under such circumstances the suspension 128 introduced into the vortex inlet has a consistency of about 2% or more (e.g. about 2-4%), and ink particles are removed by froth flotation in stream 129. For details of this process attention is directed to co-pending application Ser. No. 07/564,656, filed Aug. 9, 1990, the disclosure of which has been incorporated by reference herein.

Figure 3:
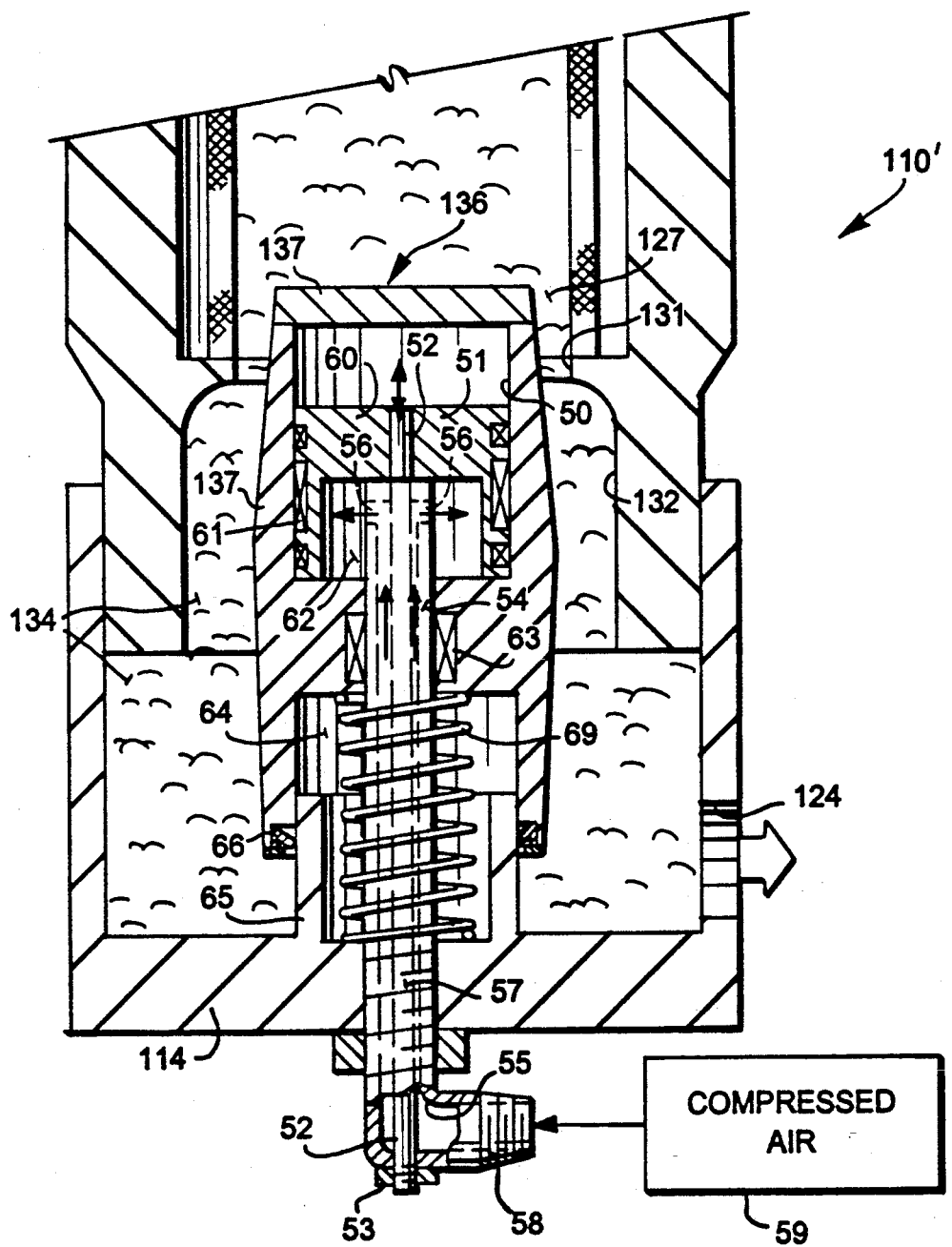
FIG. 3 is a detailed view of the annular space defining components, and accepts discharge, of a second embodiment of a gas sparged hydrocyclone according to the present invention.

FIG. 3 illustrates a second embodiment of hydrocyclone 110' according to the invention at the accepts discharge end thereof. The portion above that illustrated in FIG. 3 of the hydrocyclone 110' is identical to the FIG. 2 embodiment. The FIG. 3 embodiment structures comparable to those in the FIG. 2 embodiment or the FIG. 1 prior art construction are illustrated by the same two digit reference numeral preceded by a "1".

The plug means 136 cooperates with the first diameter 131 and second diameter 132 portions of the cyclone 110' cylindrical side wall 112. Plug element 137 is movable not only in response to back pressure, but by a fluid powered means which selectively moves it. The fluid powered means comprises a first internal cylindrical chamber 50 having a piston 51 disposed therein having a length less than the length of the chamber 50. The piston 51 is held stationary by the hollow rod 52 with a nut 53 at the end thereof and disposed within a tube 54 having an internal chamber 55 with exit ports 56 at the top thereof, and screw threads 57 near the bottom thereof for holding the tube 54 in the bottom wall 114. Nipple 58 is connected to a source of compressed air, or other fluid (such as hydraulic fluid), which passes through the conduit 55 exiting through ports 56 thereof.

A bushing 61 is provided between the stationary piston 51 and the chamber internal wall 50, and the volume 62 is for receipt of compressed air through the ports 56. The bushing 63 provides for sliding movement between the plug 137 and the tube 54, while a chamber 64 defined interiorly of the plug 137 cooperates with a guiding tube 65 extending upwardly from the bottom 114. A seal and retaining ring 66 are provided at the bottom of the plug 137, and a coil spring 69 is provided in the chamber 64 for biasing the plug 137 to the position illustrated in FIG. 3 wherein annular space 127 is defined.

In operation of the FIG. 3 embodiment, compressed air from source 59 flows through passageway 55 being exhausted through ports 56 into the volume 62, and causes the plug 137 to move downwardly with respect to the stationary piston 51, the bushing 61 allowing relative movement therebetween. The upper portion of chamber 50 is vented to atmosphere through tube 52 during the compression stroke. This compresses the coil spring 69, and once the plug 137 reaches the area of the second, enlarged diameter 132, any obstructions in the annular gap 127 are released. The enlarged volume 134 provides an enhanced differential pressure. Once the supply of air from source 59 is removed, the spring 69 will bias the plug 137 back upwardly, and the tube 52 is vented to the atmosphere so that the chamber above the piston 51 will fill with air to assist the bias of the spring 69 in moving the plug 137 upwardly. The plug means 136 will also operate in response to increased back pressure, above the bias provided by the spring 69. Compressed air from source 59 can be fed into the volume 62 periodically to make sure that the annular space 127 is cleared of obstructions on a regular basis so that there is no possibility that it can clog.

It will thus be seen that according to the present invention a hydrocyclone and method of acting upon a low consistency liquids-solids suspension are provided which allow continued operation of the hydrocyclone without interruptions due to blockage of the annular space, in a practical yet effective manner. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A hydrocyclone, comprising:
   a substantially hollow body having first and second ends, and having a wall disposed about an axis and axially elongated;
   inlet means for introducing a suspension into the hollow body at the first end thereof, so that the suspension flows in a vortex within said hollow body;
   first withdrawing means for withdrawing fluid from adjacent the axis at said first end of said body;
   a porous surface of revolution disposed within said hollow body wall generally symmetrical with said axis, a plenum defined between said body wall and said porous surface of revolution;
   means for introducing fluid into said plenum to pass through said porous surface of revolution into said vortex;
   second withdrawing means for withdrawing suspension from adjacent said second end of said body;
   movable plug means, comprising a generally cylindrical plug element having an internal area and being mounted within said body between said second withdrawing means and said porous surface of revolution for defining an annular space controlling the flow rate through said second withdrawing means;
   means for substantially linearly moving said plug means through a substantially linear length of travel which in its entirety is within said hollow body, to release any substance that becomes trapped in said annular space restricting the flow through said second withdrawing means;
   said means for moving said movable plug means comprises means for automatically moving as a result of back pressure caused by any substance that becomes trapped in said annular space, to automatically release the substance and, said means for moving said plug element comprises fluid powered means for selectively moving said plug element against the bias of a spring by feeding fluid pressure into said internal area of said plug element; and further comprising means for providing an expanded volume between said annular space and said second withdrawal means compared to the volume at said plug means when defining said annular space; and
   said means providing said expanded volume including a first, relatively small, internal open diameter near said second end of said hollow body, and a second, relatively large, internal open diameter between said first diameter and said second withdrawing means of said hollow body; and wherein said plug element is biased by said spring into a position normally defining said annular space between said plug element and said body at said first diameter, and movable against the spring bias to a position wherein the plug is in association with said second diameter, at which position any substance trapped in said annular space is released to flow to said second withdrawing means.

2. A hydrocyclone as recited in claim 1 wherein said internal area comprises a first internal cylindrical chamber, and said fluid power means comprises a piston disposed within said first chamber and having a length less than the length of said chamber; means for holding said piston stationary with respect to said body; and bushing means for guiding relative movement between said first chamber and said piston, so that upon application of fluid under pressure into said chamber, said plug element will move in said chamber against the bias of said spring while said piston remains stationary.

3. A hydrocyclone, comprising:
   a substantially hollow body having first and second ends, and having a wall disposed about an axis and axially elongated, said hollow body has a first, relatively small, internal open diameter near said second end, and a second, relatively large, internal open diameter between said first diameter and a second withdrawing means; and wherein a plug element is biased by a spring into a position normally defining an annular space between said plug element and said body at said first diameter, and movable against the spring bias to a position wherein the plug is in association with said second diameter, at which position any substance trapped in said annular space is released to flow to said second withdrawing means;
   inlet means for introducing a suspension into the hollow body at the first end thereof, so that the suspension flows in a vortex within said hollow body;
   first withdrawing means for withdrawing fluid from adjacent the axis at said first end of said body;
   a porous surface of revolution disposed within said hollow body wall generally symmetrical with said axis, a plenum defined between said body wall and said porous surface of revolution;
   means for introducing fluid into said plenum to pass through said porous surface of revolution into said vortex;
   second withdrawing means for withdrawing suspension from adjacent said second end of said body;
   movable plug means, comprising a generally cylindrical plug element having an internal area and being mounted within said body between said second withdrawing means and said porous surface of revolution for defining an annular space controlling the flow rate through said second withdrawing means; and means for substantially linearly moving said plug means through a substantially linear length of travel which in its entirety is within said hollow body, to release any substance that becomes trapped in said annular space restricting the flow through said second withdrawing means said means for moving said plug element comprising fluid powered means for selectively moving said plug element against the bias of said spring by feeding fluid pressure into said internal area of said plug element.

4. A hydrocyclone as recited in claim 3 wherein said internal area comprises a first internal cylindrical chamber, and said fluid power means comprises a piston disposed within said first chamber and having a length less than the length of said chamber; a vent tube for holding said piston stationary with respect to said body; and bushing means for guiding relative movement between said first chamber and said piston, so that upon application of fluid under pressure into said chamber, said plug element will move in said chamber against the bias of said spring while said piston remains stationary.

5. A hydrocyclone, comprising:

a substantially hollow body having first and second ends, and having a wall disposed about an axis and axially elongated;

inlet means for introducing a suspension into the hollow body at the first end thereof, so that the suspension flows in a vortex within said hollow body;

first withdrawing means for withdrawing fluid from adjacent the axis at said first end of said body;

second withdrawing means for withdrawing suspension from adjacent said second end of said body;

said hollow body having a first, relatively small, internal open diameter near said second end, and a second, relatively large, internal open diameter between said first diameter and said second withdrawing means;

movable plug means mounted within said body near said second withdrawing means for defining an annular space controlling the flow rate through said second withdrawing means;

means for substantially linearly moving said plug means to release any substance that becomes trapped in said annular space restricting the flow through said second withdrawing means; and said plug means comprising a plug element having an internal area and being biased by a spring into a position normally defining said annular space between said plug element and said body at said first diameter, and movable against the spring bias under the influence of said moving means to a position wherein the plug is in association with said second diameter, at which position any substance trapped in said annular space is released to flow to said second withdrawing means said means for moving said plug element comprises fluid powered means for selectively moving said plug element against the bias of said spring by feeding fluid pressure into said internal area of said plug element.

6. A hydrocyclone as recited in claim 5 wherein said internal area comprises a first internal cylindrical chamber, and said fluid power means comprises a piston disposed within said first chamber and having a length less than the length of said chamber; a venting tube for holding said piston stationary with respect to said body; and bushing means for guiding relative movement between said first chamber and said piston, so that upon application of fluid under pressure into said chamber, said plug element will move in said chamber against the bias of said spring while said piston remains stationary.

* * * * *